United States Patent [19]

Kanbe et al.

[11] Patent Number: 4,709,994
[45] Date of Patent: Dec. 1, 1987

[54] LIQUID CRYSTAL DEVICE USING FERROELECTRIC LIQUID CRYSTAL TWISTED IN TWO STABLE STATES

[75] Inventors: Junichiro Kanbe, Yokohama; Shinjiro Okada, Kawasaki, both of Japan

[73] Assignee: Canon Kabushiki Kaisha, Tokyo, Japan

[21] Appl. No.: 773,221

[22] Filed: Sep. 6, 1985

[30] Foreign Application Priority Data

Sep. 12, 1984 [JP] Japan .................. 59-190791

[51] Int. Cl.⁴ .............................. G02F 1/13
[52] U.S. Cl. .................. 350/350 S; 350/341
[58] Field of Search .............. 350/341, 350 S

[56] References Cited

U.S. PATENT DOCUMENTS

| | | | |
|---|---|---|---|
| 4,508,429 | 4/1985 | Nagae et al. | 350/350 S |
| 4,548,476 | 10/1985 | Kaneko | 350/350 S |
| 4,591,886 | 5/1986 | Umeda et al. | 350/350 S X |
| 4,613,209 | 9/1986 | Goodby et al. | 350/350 S |
| 4,634,226 | 1/1987 | Isogai et al. | 350/350 S X |
| 4,655,561 | 4/1987 | Kanbe et al. | 350/333 X |

FOREIGN PATENT DOCUMENTS 60-123825  7/1985  Japan .................. 350/350 S

OTHER PUBLICATIONS

Clark & Lagerwall, "Submicrosecond Bistable Electrooptic Switching . . . ", *Applied Physics Lett.*, (Jun. 1980), vol. 36, No. 11, pp. 899–901.

*Primary Examiner*—Stanley D. Miller
*Assistant Examiner*—Richard F. Gallivan
*Attorney, Agent, or Firm*—Fitzpatrick, Cella, Harper & Scinto

[57] ABSTRACT

A liquid crystal device comprising a ferroelectric liquid crystal placed under bistability condition with two stable states. The ferroelectric liquid crystal is placed under the bistability condition in the presence of a surface which has been uniaxially orientation-treated. The molecules of the ferroelectric liquid crystal align so as to be twisted in the thickness direction of the liquid crystal layer in either of the two stable states. The average dipole moments of the liquid crystal molecules in the two stable states are in mutually opposite polarities.

38 Claims, 10 Drawing Figures

LIQUID CRYSTAL DEVICE USING FERROELECTRIC LIQUID CRYSTAL TWISTED IN TWO STABLE STATES

FIELD OF THE INVENTION AND RELATED ART

The present invention relates to a liquid crystal device for use as an electrooptical switching element for a liquid crystal display device, a liquid crystal-optical shutter, etc., and a method of controlling quantity of light.

Hitherto, liquid crystal display devices are well known, which comprise a group of scanning electrodes and a group of signal electrodes arranged in a matrix manner, and a liquid crystal compound is filled between the electrode groups to form a plurality of picture elements thereby to display images or information. These display devices employ a time-sharing driving method which comprises the steps of selectively applying address signals sequentially and cyclically to the group of scanning electrodes, and in parallel effecting selective application of predetermined information signals to the group of signal electrodes in synchronism with address signals. However, these display devices and the driving method therefor have a serious drawback as will be described below.

Namely, the drawback is that it is difficult to obtain a high density of picture elements or a large image area. Because of relatively high response speed and low power dissipation, among prior art liquid crystals, most of the liquid crystals which have been put into practice as display devices are TN (twisted nematic) type liquid crystals, as shown in "Voltage-Dependent Optical Activity of a Twisted Nematic Liquid Crystal" by M. Schadt and W. Helfrich, Applied Physics Letters Vol. 18, No. 4 (Feb. 15, 1971), pp. 127-128. In the liquid crystals of this type, molecules of nematic liquid crystal which show positive dielectric anisotropy under no application of an electric field form a structure twisted in the thickness direction of the liquid crystal layers (helical structure), and molecules of these liquid crystals are aligned or oriented parallel to each other at the surfaces of both electrodes. On the other hand, nematic liquid crystals which show positive dielectric anisotropy under application of an electric field are oriented or aligned in the direction of the electric field. Thus, they can cause optical modulation. When display devices of a matrix electrode arrangement are designed by using liquid crystals of this type, a voltage higher than a threshold level required for aligning liquid crystal molecules perpendicular to electrode surfaces is applied to areas (selected points) where scanning electrodes and signal electrodes are selected at a time, whereas a voltage is not applied to areas (non-selected points) were scanning electrodes and signal electrodes are not selected and, accordingly, the liquid crystal molecules are stably aligned parallel to the electrode surfaces. When linear polarizers arranged in a cross-nicol relationship, i.e., with their polarizing axes being substantially perpendicular to each other, are arranged on the upper and lower sides of a liquid crystal cell thus formed, light does not transmit at selected points while it transmits at non-selected points. Thus, the liquid crystal cell can function as an image device.

However, when a matrix electrode structure is constituted, a certain electric field is applied to regions where scanning electrodes are selected and signal electrodes are not selected or regions where scanning electrodes are not selected and signal electrodes are selected (which regions are so-called "half-selected points"). If the difference between a voltage applied to the selected points and a voltage applied to the half-selected points is sufficiently large, and a voltage threshold level required for allowing liquid crystal molecules to be aligned or oriented perpendicular to an electric field is set to a value therebetween, the display device normally operates. However, in fact, as the number (N) of scanning lines increases, a time (duty ratio) during which an effective electric field is applied to one selected point, when a whole image area (corresponding to one frame) is scanned, decreases with a ratio of 1/N. For this reason, the larger the number of scanning lines, the smaller is the voltage difference as an effective value applied to a selected point and non-selected points when scanning is repeatedly effected. As a result, this leads to unavoidable drawbacks of lowering of image contrast or occurrence of crosstalk. These phenomena result in problems that cannot be essentially avoided, which appear when a liquid crystal not having bistability (which shows a stable state where liquid crystal molecules are oriented or aligned in a horizontal direction with respect to electrode surfaces, but are oriented in a vertical direction only when an electric field is effectively applied) is driven, i.e., repeatedly scanned, by making use of time storage effect. To overcome these drawbacks, the voltage averaging method, the two-frequency driving method, the multiple matrix method, etc., have already been proposed. However, these methods are not sufficient to overcome the above-mentioned drawbacks. As a result, it is the present state that the development of large image area or high packaging density in respect to display elements is delayed because of the fact that it is difficult to sufficiently increase the number of scanning lines.

Meanwhile, turning to the field of a printer, as means for obtaining a hard copy in response to input electric signals, a Laser Beam Printer (LBP) providing electric image signals to electrophotographic charging member in the form of lights is the most excellent in view of density of a picture element and a printing speed.

However, the LBP has drawbacks as follows:

(1) It becomes large in apparatus size.

(2) It has high speed mechanical moving parts such as a polygon scanner, resulting in noise and requirements for strict mechanical precision, etc.

In order to eliminate the drawbacks stated above, a liquid crystal shutter-array was proposed as a device for changing electric signals to optical signals. When picture element signals are provided with a liquid crystal shutter-array, however, more than 4000 signal generators are required, for instance, for writing picture element signals into a length of 200 mm in a ratio of 20 dots/mm. Accordingly, in order to independently feed signals to respective signal generators, lead lines for feeding electric signals are required to be provided to all the respective signal generators, and production has become difficult.

In view of this, another attempt was made to apply one line of image signals in a time-sharing manner with signal generators divided into a plurality of lines.

With this attempt, signal feeding electrodes can be common to the plurality of signal generators, thereby enabling a remarkable decrease the number of lead wires. However, if the number (N) of lines is increased while using a liquid crystal showing no bistability as usually practiced, a signal "ON" time is substantially reduced to 1/N. This results in difficulties that light quantity obtained on a photoconductive member is decreased, and a crosstalk occurs.

SUMMARY OF THE INVENTION

An object of the present invention is to provide a novel liquid crystal device which has solved the problems involved in the conventional liquid crystal devices or liquid crystal optical shutters.

Another object of the present invention is to provide a liquid crystal device having a high response speed characteristic.

A further object of the present invention is to provide a liquid crystal device having a high density of picture elements.

According to one aspect of the present invention, there is provided a liquid crystal device comprising a first base plate, a second base plate and a ferroelectric liquid crystal disposed between the first and second base plates and placed under bistability condition comprising a first state and a second state; the ferroelectric liquid crystal being placed under the bistability condition in the presence of a surface which has been subjected to a uniaxial orientation treatment in an axial direction O, the liquid crystal molecules in the first state being arranged so as to be successively twisted from an axis A to an axis Aa, and the liquid crystal molecules in the second state being arranged so as to be successively twisted from an axis B to an axis Ba; wherein the axis A denotes the projection of a liquid crystal molecular axis in the vicinity of the first base plate face onto the first base plate face in the first state, the axis Aa denotes the projection of a liquid crystal molecular axis in the vicinity of the second base plate face onto the second base plate face, in the first state, the axis B denotes the projection of a liquid crystal molecular axis in the vicinity of the first base plate face onto the first base plate face in the second state, and the axis Ba denotes the projection of a liquid crystal molecular axis in the vicinity of the second base plate face onto the second base plate face in the second state:

According to another aspect of the present invention, there is provided a liquid crystal device comprising first and second base plates having mutually opposite electrodes, a ferroelectric smectic liquid crystal sandwiched between the first and second base plates, a polarizer disposed in the neighborhood of the first base plate, and an analyzer disposed in the neighborhood of the second base plate, the polarizer and analyzer are so disposed that their transmission (or absorption) axes do not cross at a right angle.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Smectic liquid crystals showing ferroelectric suited for use in the present invention include liquid crystals showing a chiral smectic C phase (SmC*), H phase (SmH*), F phase (SmF*), I phase (SmI*), J phase (SmJ*), G phase (SmG*) or K phase (SmK*).

Details of such ferroelectric liquid crystals are described in, e.g., "LE JOURNAL DE PHYSIQUE LETTERS" 36 (L-69) 1975, "Ferroelectric Liquid Crystals"; "Applied Physics Letters" 36 (11) 1980, "Submicro Second Bistable Electrooptic Switching in Liquid Crystals"; "Solid State Physics" 16 (141) 1981, "Liquid Crystals", etc. In the present invention, ferroelectric liquid crystals disclosed in these publications may be used.

Figure 1:
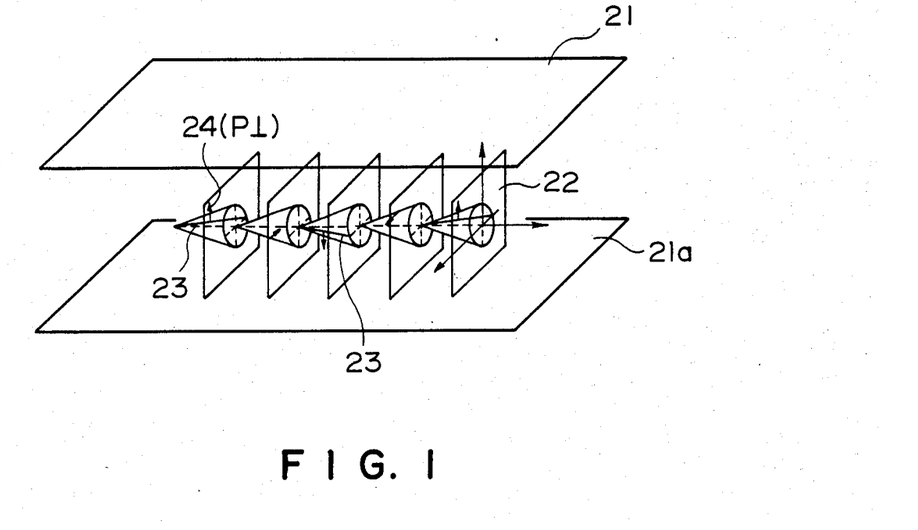
FIGS. 1 and 2 are schematic perspective views illustrating the basic operation principle of a liquid crystal cell used in the present invention.

Referring to FIG. 1, there is schematically shown an example of a ferroelectric liquid crystal cell for explanation of the operation thereof. Reference numerals 21 and 21a denote base plates (glass plates) on which a transparent electrode of, e.g., $In_2O_3$, $SnO_2$, ITO (Indium-Tin Oxide), etc., is disposed, respectively. A liquid crystal of a chiral smectic phase such as SmC*, SmH*, SmF*, SmI* or SmG*, in which liquid crystal molecular layers 22 are oriented perpendicular to surfaces of the glass plates, is hermetically disposed therebetween. A full line 23 shows liquid crystal molecules. The liquid crystal molecules 23 continuously form a helical structure in the direction of extension of the base plates. Each liquid crystal molecule 23 has a dipole moment (P⊥) 24 in a direction perpendicular to the axis thereof. When a voltage higher than a certain threshold level is applied between electrodes formed on the base plates 21 and 21a, a helical structure of the liquid crystal molecule 23 is loosened or unwound to change the alignment direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 2:
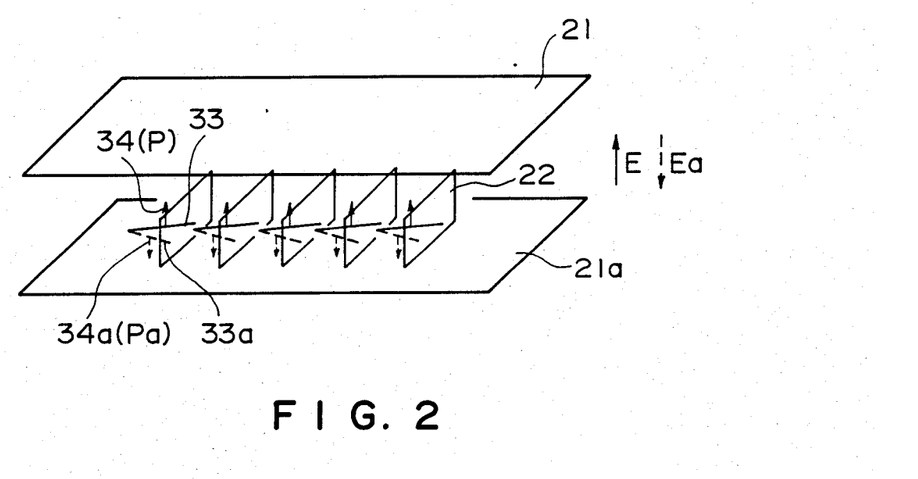

The liquid crystal layer in the liquid crystal device of the present invention may be rendered sufficiently thin in thickness (e.g., less than 10 $\mu$). As the thickness of the liquid crystal layer is decreased, the helical structure of the liquid crystal molecules is loosened even in the absence of an electric field whereby the dipole moment assumes either of the two states, i.e., P in an upper direction 34 or Pa in a lower direction 34a as shown in FIG. 2. When an electric field E or Ea higher than a certain threshold level and different from each other in polarity as shown in FIG. 2 is applied to a cell having the above-mentioned characteristics, the dipole moment is directed either in the upper direction 34 or in the lower direction 34a depending on the vector of the electric field E or Ea. In correspondence with this, the liquid crystal molecules are oriented in either a first stable state 33 or a second stable state 33a.

When the above-mentioned ferroelectric liquid crystal is used as an optical modulation element, it is possible to obtain two advantages as briefly noted hereinbefore. First is that the response speed is quite fast. Second is that the orientation of the liquid crystal shows bistability. The second advantage will be further explained, e.g., with reference to FIG. 2. When the electric field E is applied to the liquid crystal molecules, they are oriented in the first stable state 33. This state is kept stable even if the electric field is removed. On the other hand, when the electric field Ea of which direction is opposite to that of the electric field E is applied thereto, the liquid crystal molecules are oriented to the second stable state 33a, whereby the directions of molecules are changed. This state is similarly kept stable even if the electric field is removed. Further, as long as the magnitude of the electric field E or Ea being applied is not above a certain threshold value, the liquid crystal molecules are placed in the respective orientation states. In order to effectively realize high response speed and bistability, it is preferable that the thickness of the cell is as thin as possible and generally 0.5 to 20μ, particularly 1 to 5μ. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

As a result of our further study for optimization of the liquid crystal device through investigation of the molecular alignment of smectic liquid crystals having ferroelectricity and the combination of a polarizer and an analyzer, we have found that the liquid crystal molecules do not always assume a simple alignment state as described above but assume various alignment states depending on several factors including methods of treating base plates, the liquid crystal used, and the thickness of a liquid crystal layer. More specifically, we have found that the liquid crystal molecules have such a structure that they are twisted in the thickness direction of the liquid crystal layer and that the polarizer and the analyzer provide the maximum contrast under a condition where they do not cross at right angles, particularly where they are arranged in a cross nicol relationship so as to form an angle of 90°±(2.5°–25°). This effect is particularly pronounced when the liquid crystal layer is sufficiently thin so as to provide bistability or when a base plate has been subjected to a uniaxial orientation treatment.

Hereinbelow, the present invention will be explained based on specific working examples.

EXAMPLE 1

A liquid crystal material comprising a mixture of the following three components was used.

4-n-octyloxyphenyl-4'''-(2-methylbutyl)biphenyl-4'-carboxylate

-continued 4-(2-methylbutyloxy)phenyl-4'-n-oxtyloxybenzoate 4-(2'-methylbutyl)phenyl-4''-(n-octyloxy)biphenyl-4'-carboxylate.

A glass base plate with ITO electrodes formed thereon was coated with a film of a polyimide (Trade name: Semicofine) in a thickness of 400 Å. The base plate was then rubbed with a rotating fur brush. Two of the thus treated base plates were spaced opposite each other with spacers to form a cell with a 3μ-thick gap. The above-mentioned liquid crystal material was heated to a temperature of 100° C. providing the isotropic phase and poured into the cell thus prepared. The cell was gradually cooled under control at a rate of 5° C./hour, whereby the liquid crystal in the cell caused a successive phase transition through Ch phase (cholesteric phase) and SmA phase (smectic A phase) to reach SmC* phase (chiral smectic C phase). The successive phase transition was identified by observation through a polarizer and an analyzer disposed to sandwich the liquid crystal cell. In the SmA phase, the liquid crystal molecules were arranged so that their long axes aligned in the rubbing direction. Thus, the layers of the smectic phase were disposed perpendicular to both the rubbing direction and the base plate faces. On further temperature decrease from the SmA phase, the SmC* phase was attained. As the liquid crystal layer thickness was sufficiently thin, the spiral structure or texture was loosened to result in a nonspiral structure, so that the presence of two stable states was confirmed by observation through the combination of a polarizer and an analyzer arranged to cross each other at right angles. This state is more specifically explained hereinbelow.

Figure 3:
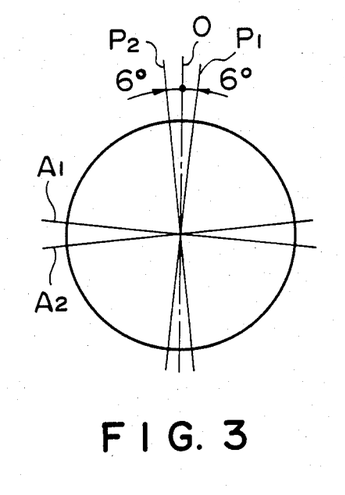
FIGS. 3, 5, 7 and 9 are respectively explanatory views for explaining a positional relationship between the direction of a uniaxial orientation and the transmission (or absorption) axes of a polarizer and an analyzer for providing a maximum contrast under a condition that the axes are held to cross each other at right angles.

FIG. 3 is an explanatory view for explaining a relationship between the rubbing direction and the polarization axes when light source/polarizer/liquid crystal/analyzer are arranged in the order named along an optical path on which the eyes of a viewer are also placed.

The axis or line O represents a rubbing direction (i.e., a uniaxial orientation direction), while the lines $P_1$, $P_2$ and $A_1$, $A_2$ represent transmission axes (or absorption axes) of a polarizer and an analyzer, respectively. As mentioned hereinbefore, two stable states could be observed in the SmC* phase obtained by gradual cooling from the isotropic phase. Thus, when the SmC* phase was observed through a polarizer and an analyzer with their transmission axes (or absorption axes) crossing each other at right angles and arranged to form appropriate angles from the axis O, it was observed that the liquid crystal phase was divided into two types of domains forming ordinarily a spotted pattern. For example, under the condition that the liquid crystal cell was maintained at a temperature of 50° C., the two domains were observed with a maximum contrast for this system in dark (deep green) and bright (yellow), respectively, when the angle between the axis O and the transmission (or absorption) axis $P_1$ of the polarizer was 6° and the angle between the transmission (or absorption) axis $P_1$ and the transmission (or absorption) axis $A_1$ was 90°.

Further, when the transmission (or absorption) axes of the polarizer/analyzer were rotated to the positions ($P_2$/$A_2$) symmetrical to those mentioned above with respect to the axis O, the above domains were reversed in display state. Thus, the domains which had been dark (deep green) for the ($P_1$/$A_1$) arrangement now turned to bright (yellow), while the domains which had been bright (yellow) now turned to dark (deep green). Further, under the condition that the polarizer and the analyzer were arranged to form 90° between their transmission (or absorption) axes, when one polarity (e.g., +) of D.C. voltage pulse was applied between the base plates, the entire cell turned to display dark (deep green). Then, when the other polarity (−) of D.C. voltage pulse was applied, the entire cell turned to bright (yellow). From the above observation, it is possible to consider that the two stable states included one state where the projection of the liquid crystal molecular axes onto the base plates was on average oriented to the direction of the axis $P_1$ and the other state where such projection was average oriented to the direction of the axis $P_2$. Further, as these states were shifted to each other by application of opposite polarities of D.C. voltage pulses, these two states respectively had definite and mutually opposite average electric dipole moments in the direction normal to the base plate faces.

Then, it was tried to make either one state most dark so that a larger maximum contrast could be obtained, when compared with the above arrangement of the transmission (or absorption) axes of the polarizer and the analyzer, by changing the positional relationship between the transmission (or absorption) axes of the polarizer and the analyzer from the perpendicular crossing relationship and also by changing the positional relationship with respect to the liquid crystal cell. The resultant positional relationships are shown in FIG. 4.

Figure 4:
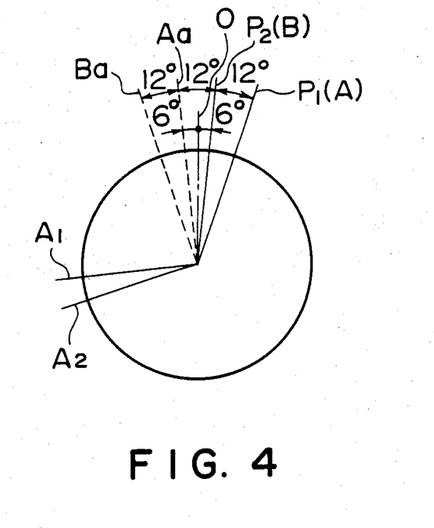
FIGS. 4, 6, 8 and 10 are explanatory views corresponding to FIGS. 3, 5, 7 and 9, respectively, for explaining a similar positional relationship for providing a maximum contrast according to the present invention with a polarizer and an analyzer crossing each other at non-right angles.

As shown in FIG. 4, when the transmission (or absorption) axis $P_1$ of the polarizer was set to form an angle of about 18° from the axis O, and the transmission (or absorption) axis $A_1$ of the analyzer was set to an axial direction of approximately 24° away in the anticlockwise direction from the direction normal to the polarizer so that an angle of 90°+24° was formed between the axes $P_1$ and $A_1$, the dark domain was made the most dark to be black compared with the case of 90° between the axes $P_1$ and $A_1$ as shown in FIG. 3, the two domains gave a largest contrast with the combination of the black and yellow. The angle of 24° corresponds to the angle between the axes A and Aa. Then, when the relative position between the polarizer/analyzer combination and the liquid crystal cell was changed so that the transmission (or absorption) axis of the polarizer was set to an axis $P_2$ shown in FIG. 4 and the transmission (or absorption) axis of the analyzer was set to an axis $A_2$, the domains reversed their bright and dark display states. From the above observation, it may be concluded that the two stable states include one state where the projection of the liquid crystal molecular axes is oriented to the axis A direction in the vicinity of a first base plate (one on the side of the polarizer) while being gradually twisted to be oriented to the axis Aa direction in the vicinity of a second base plate (one on the side of the analyzer), and the other state where the projection is oriented to the axis B direction in the vicinity of the first base plate while being gradually twisted to be oriented to the axis Ba direction in the vicinity of the second base plate. Further, it is possible to stereoscopically consider that the liquid crystal molecules do not lie in parallel with the base plate faces as schematically shown in FIG. 2 but are present on cones as shown in FIG. 1 so that their positions on the cones are different in the thickness direction.

Anyway, when the base plate faces have been subjected to a uniaxial orientation treatment (e.g., rubbing) in the direction of the axis O, a liquid crystal with a maximum contrast given by the darkest dark state is obtained when the transmission (or absorption) axis of a polarizer is set to substantially coincide with an axis A (or B) and the transmission (or absorption) axis of an analyzer is set to substantially coincide with an axis Aa (or Ba), wherein the axis A denotes the projection of liquid crystal molecules onto a first base plate face in the vicinity of the first base plate face in a first state among the two stable states; the axis Aa denotes the projection of liquid crystal molecules onto a second base plate in the vicinity of the second base plate face in the first state; the axis B denotes the projection of liquid crystal molecules onto the first base plate face in the vicinity thereof; and the axis Ba denotes the projection of liquid crystal molecules onto the second base plate face in the vicinity thereof.

Further, in this particular example, maximum contrast can be obtained when the transmission (or absorption) axis $P_1$ (or $P_2$) is set to substantially coincide with the axis A (or B), the transmission or absorption) axis $A_1$ (or $A_2$) is set to substantially coincide with the axis Aa (or Ba), and the angle $\theta_1$ between the axis $P_1$ (or $P_2$) and the axis $A_1$ (or $A_2$) is set at 90°+24°.

Thus, in the present invention, an improved contrast is obtained by causing the angle between the axis $P_1$ (or $P_2$) and the axis $A_1$ (or $A_2$) to deviate from 90°.

Further, it is desirable to set the angle between the axes O and A to be substantially equal to the angle between the axes O and Ba or to set the angle between the axes O and Aa to be substantially equal to the angle between the axes O and B.

EXAMPLE 2

A liquid crystal material comprising a mixture of the following three components was used.

A glass plate having ITO electrodes thereon and no orientation controlling film was applied by the medium of spacers to a glass plate coated with a polyimide film and subjected to an orientation treatment in quite the same manner as in Example 1. The resultant blank cell had a gap of 1.1 micron. The above mentioned liquid crystal material was heated to 60° C. to form the isotropic phase and poured into the above obtained blank cell. The resultant liquid crystal cell was gradually cooled under control at a rate of 10° C./hour to 28° C. providing the SmC* phase.

Figure 5:
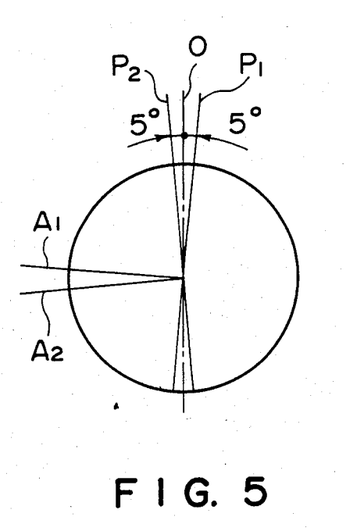

FIG. 5 illustrates relative positions providing a maximum contrast under the condition that the polarizer and the analyzer are arranged to have their transmission (or absorption) axes crossing each other at right angles, showing that the combination of $P_1$ or $P_2$ each forming an angle of 5° from the rubbing direction O and $A_1$ or $A_2$ normal to the $P_1$ or $P_2$ was proper. The same display state was obtained by rotating the liquid crystal cell (thus, the axis O) by 90° while fixing the positions of the transmission (or absorption) axes of the polarizer and the analyzer. While one polarity of D.C. voltage pulse (+20 V, 500 μsec) was applied to the cell with the combination of the axes $P_1$ and $A_1$ disposed normal to each other, the visual field turned to dark grey which was stable even after removal of the electric field. Then, when the other polarity of D.C. voltage pulse (−20 V, 500 μsec) was applied to the cell, the visual field turned to bright white which was stable even after removal of the electric field. The contrast between the two stable states was approx. 1:10. The above bright and dark states were of course reversed when the cell was combined with the axes $P_2$ and $A_2$ disposed normal to each other.

Figure 6:
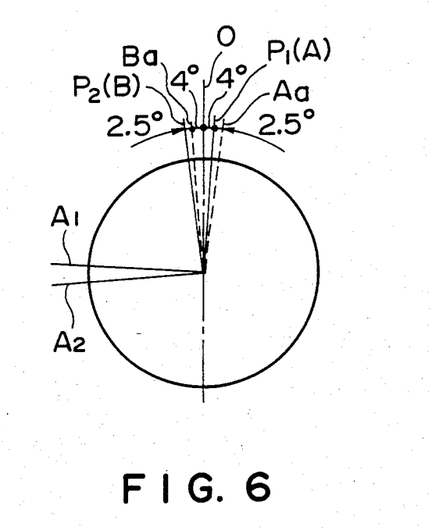

FIG. 6 shows an improved arrangement of the liquid crystal cell according to the present invention in a similar manner as in FIG. 4. As in the case of FIG. 4, when the angle between the transmission (or absorption) axis $P_1$ of the polarizer and the transmission (or absorption) axis $A_1$ of the analyzer was set at 90°−2.5° and the angle between the axes $P_1$ and O was set at 4°, a maximum contrast was obtained. The resultant dark state (dark black) and bright state (white) were switched to each other by the application of the electric fields as described with reference to FIG. 5. The contrast obtained at this time was 1:15. Further, when the combination of the axes $P_1$ and $A_1$ forming 90°−2.5° was replaced by the combination of the axes $P_2$ and $A_2$ forming 90°−2.5°, the above dark and bright states were switched to each other.

The projection of the liquid crystal molecules onto the base plate faces in the vicinity of the base plate faces is also shown. The projection corresponds to the axis A in the vicinity of the first base plate face and the axis Aa in the vicinity of the second base plate face in the first stable state, while it corresponds to the axis B in the vicinity of the first base plate face and the axis Ba in the vicinity of the second base plate face in the second stable state.

EXAMPLE 3

A liquid crystal cell was prepared in the same manner as in Example 2 except that the liquid crystal layer thickness was made 2.7μ.

Figure 7:
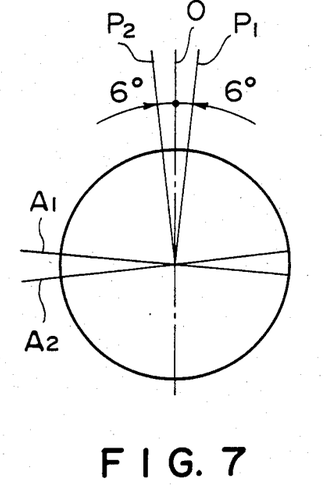
Figure 8:
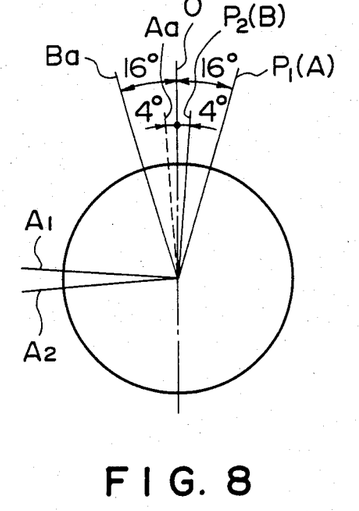

FIG. 7 shows an optimum arrangement under the condition that the transmission (or absorption) axes of the polarizer and the analyzer cross each other at right angles. FIG. 8 shows an optimum arrangement providing a larger contrast under the condition that the transmission (or absorption) axes do not form right angles, and also the projection of the liquid crystal molecules onto the base plate faces in the vicinity of the base plate faces.

The two stable states obtained under the normal polarizer-analyzer crossing condition (FIG. 7) had hues, i.e., green in the dark state and yellow in the bright state. As shown in FIG. 8, when the angle between the polarizer and the analyzer was increased from 90° by 20° and the angle between the polarizer and the rubbing direction (axis O) was set to be 4° or 16°, a dark state of dark blue and a bright state of yellow white were obtained to provide a larger contrast. In this way, by arranging the polarizer and the analyzer to deviate from the normal relationship, a larger contrast was obtained and also different hues are obtained.

EXAMPLE 4

DOBAMBC (decyloxybenzylidene-p'-amino-2-methylbutyl cinnamate) was used to form a 1.6 μ-thick liquid crystal layer between a pair of base plates obtained as in Example 1 including the rubbing treatment.

Figure 9:
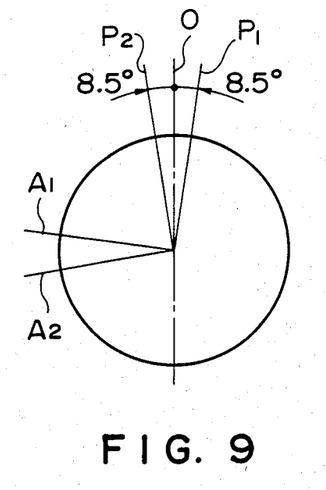
Figure 10:
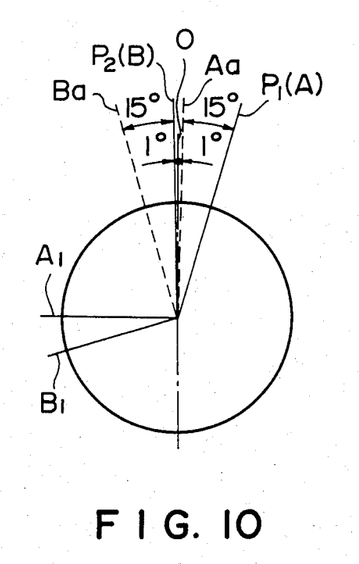

Arrangement views for this cell at 35° C. are shown in FIGS. 9 and 10. FIG. 9 shows the combination of the transmission axes $P_1$ and $A_1$ (or $P_2$ and $A_2$) forming right angles of the polarizer and the analyzer. FIG. 10 shows the combination of the axes $P_1$ and $A_1$ (or $P_2$ and $A_2$) forming an angle of 90°+15° deviating from 90° by 15°. Thus, as shown in FIG. 10, a maximum contrast was given when the polarizer and the analyzer formed an angle of 90°+15°.

What is claimed is:

1. A liquid crystal device comprising a first base plate, a second base plate and a ferroelectric liquid crystal disposed between the first and second base plates and placed under bistability condition comprising a first state and a second state; said ferroelectric liquid crystal being placed under the bistability condition in the presence of a surface which has been subjected to a uniaxial orientation treatment in an axial direction O, the liquid crystal molecules in the first state being arranged so as to be successively twisted from an axis A to an axis Aa, and the liquid crystal molecules in the second state being arranged so as to be successively twisted from an axis B to an axis Ba; wherein the axis A denotes the projection of a liquid crystal molecular axis in the vicinity of the first base plate face onto the first base plate face in the first state, the axis Aa denotes the projection of a liquid crystal molecular axis in the vicinity of the second base plate face onto the second base plate face, in the first state, the axis B denotes the projection of a liquid crystal molecular axis in the vicinity of the first base plate face onto the first base plate face in the second state, and the axis Ba denotes the projection of a liquid crystal molecular axis in the vicinity of the second base plate face onto the second base plate face in the second state.

2. The liquid crystal device according to claim 1, wherein the angle between the axes O and A is substantially equal to the angle between the axes O and Ba.

3. The liquid crystal device according to claim 1, wherein the angle between the axes O and Aa is substantially equal to the angle between the axes O and B.

4. The liquid crystal device according to claim 1, wherein the axis A substantially coincides with the transmission (or absorption) axis of the polarizer and, when the angle between the axes A and Aa is denoted by $\theta_1$, the transmission (or absorption) axis of the analyzer is disposed so that it will form an angle of $90° \pm \theta_1$ with the transmission (or absorption) axis of the polarizer.

5. The liquid crystal device according to claim 1, wherein the axis A substantially coincides the transmission (or absorption) axis of the polarizer and the axis Aa substantially coincides with the transmission (or absorption) axis of the analyzer.

6. The liquid crystal device according to claim 1, wherein said uniaxial orientation treatment is a rubbing treatment.

7. The liquid crystal device according to claim 1, wherein said ferroelectric liquid crystal is a chiral smectic liquid crystal.

8. The liquid crystal device according to claim 7, wherein said chiral smectic liquid crystal is in chiral smectic C phase, H phase, F phase, I phase, J phase, G phase or K phase.

9. The liquid crystal device according to claim 1, wherein said ferroelectric liquid crystal is in a phase formed by phase transition from smectic A phase on temperature decrease.

10. The liquid crystal device according to claim 1, wherein said ferroelectric liquid crystal is in a phase formed by a successive phase transition through cholesteric phase and smectic A phase in the order named.

11. A liquid crystal device comprising a ferroelectric liquid crystal placed under bistability condition comprising two stable states, said ferroelectric liquid crystal being placed under the bistability condition in the presence of a surface which has been subjected to a uniaxial orientation treatment, the molecules of the ferroelectric liquid crystal aligning so as to be twisted in the direction of the liquid crystal layer thickness in either of the two stable states, the average electric dipole moments of the liquid crystal molecules in the two stable states being in mutually opposite polarities.

12. The liquid crystal device according to claim 11, wherein said uniaxial orientation treatment is a rubbing treatment.

13. The liquid crystal device according to claim 11, wherein said ferroelectric liquid crystal is a chiral smectic liquid crystal.

14. The liquid crystal device according to claim 13, wherein said chiral smectic liquid crystal is in chiral smectic C phase, H phase, F phase, I phase, J phase, G phase or K phase.

15. The liquid crystal device according to claim 11, wherein said ferroelectric liquid crystal is in a phase formed by phase transition from smectic A phase on temperature decrease.

16. The liquid crystal device according to claim 11, wherein said ferroelectric liquid crystal is in a phase formed by a successive phase transition through cholesteric phase and smectic A phase in the order named.

17. A liquid crystal device comprising first and second base plates having mutually opposite electrodes, a ferroelectric smectic liquid crystal sandwiched between the first and second base plates, a polarizer disposed in the neighborhood of the first base plate, and an analyzer disposed in the neighborhood of the second base plate, said polarizer and analyzer are so disposed that their transmission (or absorption) axes do not cross at right angles.

18. The liquid crystal device according to claim 17, wherein the transmission (or absorption) axes of the polarizer and the analyzer form an angle of 90°±(2.5° to 25°).

19. The liquid crystal device according to claim 17, wherein said ferroelectric smectic liquid crystal is placed under bistability condition comprising two stable states of molecular arrangement so that the two stable states of molecular arrangement are switched to each other to cause optical switching by applying mutually opposite polarities of voltages to the opposite electrodes.

20. The liquid crystal device according to claim 19, wherein the molecules of the ferroelectric liquid crystal align so as to be twisted in the direction of the liquid crystal layer thickness in either of the two stable states.

21. The liquid crystal device according to claim 17, wherein said ferroelectric smectic liquid crystal is a chiral smectic liquid crystal.

22. The liquid crystal device according to claim 21, wherein said chiral smectic liquid crystal is in chiral smectic C phase, H phase, F phase, I phase, J phase, G phase or K phase.

23. A switching device for electrooptically switching light rays from a light source, comprising:
 a. switching means comprising a pair of oppositely spaced electrodes and a ferroelectric liquid crystal disposed between the opposite electrodes and placed under bistability condition comprising two stable states in the presence of a surface which has been subjected to a uniaxial orientation treatment, the molecules of the ferroelectric liquid crystal aligning so as to be twisted in either of the two stable states,
 b. means for applying a first voltage signal for orienting the liquid crystal molecules to one stable state and a second voltage signal for orienting the liquid crystal molecules to the other stable state, and
 c. means for detecting an optical difference between a light ray having passed through ferroelectric liquid crystal molecules oriented to said one stable state and a light ray having passed through ferroelectric liquid crystal molecules oriented to said other stable state.

24. The switching device according to claim 23, wherein the electric fields of said first and second voltage signals are mutually opposite in direction.

25. The switching device according to claim 23, wherein said first and second voltage signals are mutually opposite polarities of voltages.

26. The switching device according to claim 23, wherein said means for detecting an optical difference comprises a polarizer and an analyzer arranged in cross nicols.

27. The switching device according to claim 26, wherein the transmission (or absorption) axes of the polarizer and the analyzer do not cross at right angles.

28. The switching device according to claim 27, wherein the transmission (or absorption) axes of the polarizer and the analyzer form an angle of 90°±(2.5° to 25°).

29. A switching device for electrooptically switching light rays from a light source, comprising:
 a. switching means comprising a pair of oppositely spaced electrodes and a ferroelectric liquid crystal disposed between the opposite electrodes and placed under bistability condition comprising two stable states in the presence of a surface which has been subjected to a uniaxial orientation treatment in an axial direction O, the liquid crystal molecules in the first state being arranged so as to be successively twisted from an axis A to an axis Aa, and the liquid crystal molecules in the second state being arranged so as to be successively twisted from an axis B to an axis Ba, wherein the axis A denotes the projection of a liquid crystal molecular axis on the vicinity of the first base plate face onto the first base plate face in the first state, the axis Aa denotes the projection of a liquid crystal molecular axis in the vicinity of the second base plate face onto the second base plate face, in the first state, the axis B denotes the projection of a liquid crystal molecular axis in the vicinity of the first base plate face onto the first base plate face in the second state, and the axis Ba denotes the projection of a liquid crystal molecular axis in the vicinity of the second base plate face onto the second base plate face in the second state, b. means for selectively applying first and second voltage signals of which the electric fields are in mutually opposite directions between the opposite electrodes, and c. optical detecting means comprising a polarizer so arranged that the transmission (or absorption) axis substantially coincides with any one axis of said axes A, Aa, B, and Ba.

30. The switching device according to claim 29, wherein said optical detecting means further comprises an analyzer, the transmission (or absorption) axis substantially coincides with the axis A and, when the angle between the axes A and Aa is denoted by $\theta_1$, the transmission (or absorption) axis of the analyzer is disposed so that it will form an angle of $90° \pm \theta_1$ with the transmission (or absorption) axis of the polarizer.

31. The switching device according to claim 29, wherein said optical detecting means further comprises an analyzer, the transmission (or absorption) axis substantially coincides with the axis A, and the transmission (or absorption) axis of the analyzer substantially coincides with the axis Aa.

32. The switching device according to claim 29, wherein said first and second voltage signals have mutually opposite polarities.

33. The liquid crystal device according to claim 29, wherein the angle between the axes O and A is substantially equal to the angle between the axes O and Ba.

34. The liquid crystal device according to claim 29, wherein the angle between the axes O and Aa is substantially equal to the angle between the axes O and B.

35. A method of controlling quantity of light, comprising:

a. providing a liquid crystal device comprising a pair of base plates and a ferroelectric liquid crystal disposed between the base plates and placed under bistability condition comprising first and second states, b. providing a polarizer and an analyzer arranged in cross nicols, disposing the polarizer so that the transmission (or absorption) axis thereof substantially coincides with the molecular axis of the liquid crystal oriented to the first state, and c. causing the transmission (or absorption) axis of the polarizer to deviate by a predetermined angle from the molecular axis of the liquid crystal oriented to the first state, while keeping constant the angle between the transmission (or absorption) axes of the polarizer and the analyzer, thereby to regulate the quantity of light rays switched by the liquid crystal device.

36. The method according to claim 35, wherein the molecules of the ferroelectric liquid crystal align so as to be twisted in the direction of the liquid crystal layer thickness in either of the two states, and the average electric dipole moments of the liquid crystal molecules in the two states being in mutually opposite polarities.

37. The method according to claim 35, wherein said ferroelectric liquid crystal is a chiral smectic liquid crystal.

38. The method according to claim 37, wherein said chiral smectic liquid crystal is in chiral smectic C phase, H phase, F phase, I phase, J phase, G phase or K phase.

* * * * *